United States Patent [19]

Partington et al.

[11] Patent Number: 4,602,412

[45] Date of Patent: Jul. 29, 1986

[54] METHOD FOR ASSEMBLING IN A CIRCULAR ARRAY TURBINE BLADES EACH WITH AN INTEGRAL SHROUD

[75] Inventors: Albert J. Partington; Ronald E. Warner, both of Media, Pa.

[73] Assignee: Westinghouse Electric Corp., Pittsburgh, Pa.

[21] Appl. No.: 730,218

[22] Filed: May 3, 1985

Related U.S. Application Data

[62] Division of Ser. No. 446,093, Dec. 2, 1982, Pat. No. 4,533,298.

[51] Int. Cl.[4] .......................... B21K 3/04; B23P 15/04

[52] U.S. Cl. .......................... 29/156.8 B; 29/156.8 R; 29/525

[58] Field of Search .................... 29/156.8 B, 156.8 R, 29/525; 416/190, 191, 195, 196

[56] References Cited

U.S. PATENT DOCUMENTS 2,354,587 7/1944 Franck .......................... 29/156.8 B
2,510,734 6/1950 Bodger ................................ 416/190
2,620,554 12/1952 Mochel et al. ................. 29/156.8 B
2,681,500 6/1954 Whitehead ..................... 29/156.8 B
3,328,867 7/1967 Guengant ....................... 29/156.8 B

FOREIGN PATENT DOCUMENTS 994537 6/1965 United Kingdom ........... 29/156.8 B

*Primary Examiner*—Howard N. Goldberg
*Assistant Examiner*—Ronald S. Wallace
*Attorney, Agent, or Firm*—F. J. Baehr, Jr.

[57] ABSTRACT

A circular array of rotatable blades formed from blades having an integral shroud with a leading planar surface and a trailing planar surface, the leading planar surface being generally parallel to an axial radial plane passing through the center of the root of the blade and the trailing planar surface, if extended, intersecting the axial radial plane passing through the center of the root of the blade to form an angle generally equal in degrees to 360 divided by the number of blades forming the circular array.

3 Claims, 4 Drawing Figures

METHOD FOR ASSEMBLING IN A CIRCULAR ARRAY TURBINE BLADES EACH WITH AN INTEGRAL SHROUD

This is a division of application Ser. No. 446,093, filed Dec. 2, 1982, now U.S. Pat. No. 4,533,298, issued Aug. 6, 1985.

BACKGROUND OF THE INVENTION

This invention relates to turbine blades and more particularly to rotating blades for a turbine.

In steam turbines arrays of rotating blades are often joined together at their tip by a shroud ring which is normally riveted to the blade via a tenon made integral with the blade. The tenon being an abrupt change in cross-section of the blade is subject to stress cracking together with bending moments imposed by the shroud ring and provides crevices wherein corrosion products are accumulated which often results in corrosion cracking, however, the shroud rings greatly reduce blade vibration.

SUMMARY OF THE INVENTION

In general, a plurality of rotatable blades disposed in a circular array, when made in accordance with this invention, comprise blades having a root portion, which fasten the blades to the rotor, an air foiled shaped blade portion having a leading edge and a trailing edge, and a shroud portion made integral with the blade portion and disposed on the radially outer end of the blade portion. The shroud portion has a leading planar surface and a trailing planar surface. The leading planar surface is disposed generally parallel to an axial radial plane passing through the central portion of the root portion and the trailing planar surface if extended forms an angle with the radial axial plane passing through the center of the root portion generally equal in degrees to 360 divided by the number of blades forming the circular array.

BRIEF DESCRIPTION OF THE DRAWINGS

The objects and advantages of this invention will become more apparent by reading the following detailed description in conjunction with the accompanying drawings, in which.

DESCRIPTION OF THE PREFERRED EMBODIMENT

Figure 1:
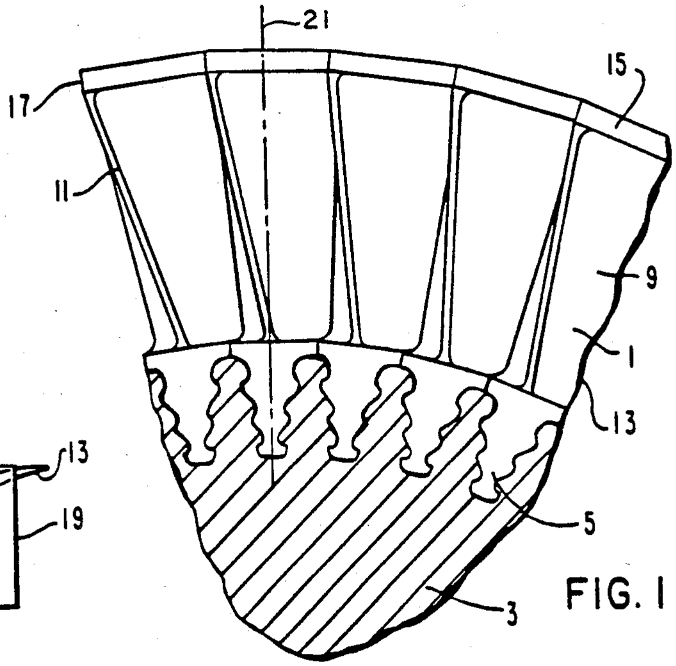
FIG. 1 is a partial sectional view of a circular array of rotatable blades disposed in a rotor.

Referring now to the drawings in detail and in particular to FIG. 1, there is shown a portion of a circular array of rotatable turbine blades 1 disposed in a portion of a turbine rotor 3.

Figure 3:
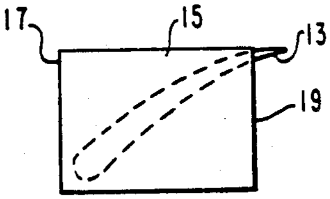
FIG. 3 is a plan view of the blade.
Figure 2:
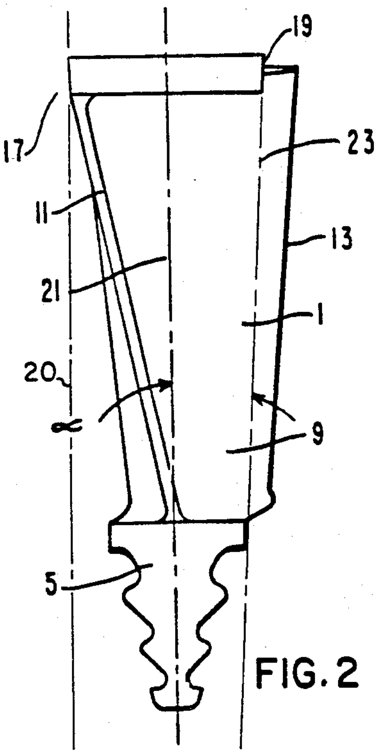
FIG. 2 is an elevational view of a blade.
Figure 4:
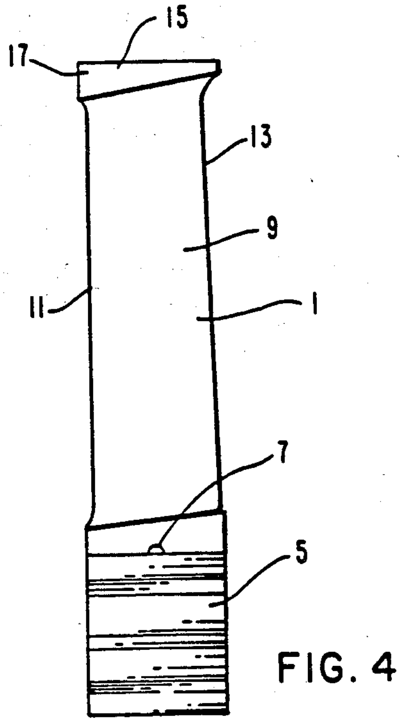
FIG. 4 is an elevational view of the blade.

As shown best in FIGS. 2, 3 and 4, each turbine blade comprises a Christmas tree shaped root portion 5 which registers with a similarly shaped groove in the rotor 3 to fasten the blades 1 to the rotor 3. To prevent axial movement of the blades, a pin (not shown) fits a semicircular groove 7 in the blade 1, which registers with a semicircular groove in the rotor 3 (not shown).

Extending radially outwardly from the root portion 5 is an air foiled shaped blade portion 9 having leading and trailing edges 11 and 13, respectively. Disposed radially outwardly of the blade portion 9 and made integral therewith is a shroud portion 15. The shroud portion 15 has a leading planar surface 17 and a trailing planar surface 19. The leading planar surface 17 as indicated by the line 20 which represents the extension of the planar surface 17 is generally parallel to an axial radial plane 21 passing through the center portion of the root portion 5. The trailing planar surface 19 if extended as indicated at 23 forms an angle $\alpha$ with the radial axial plane generally equal in degrees to 360 divided by the number of blades in the circular array.

The leading planar surface 17 extends a few thousandths of an inch beyond the leading edge of the blade portion 9 and the trailing edge 13 of the blade portion 9 extends substantially beyond the trailing planar surface 19 of the shroud portion 15.

The outer periphery of the shroud portion 15 is machined to form a cylindrical ring which cooperates with labyrinth seals to form a rotating seal.

The method of forming the circular array of blades 1 comprises the steps of forming each blade with a shroud portion 15 made integral with a blade portion 9, the shroud portion 15 having a leading planar surface 17 and a trailing planar surface 19;

forming the leading planar surface 17 so that it is generally parallel to an axial radial plane 21 passing through the center portion of the root portion 5;

forming the trailing planar surface 19 so that if it were extended, it would form an angle with the axial radial plane passing through the central portion of the root portion 5 generally equal in degrees to 360 divided by the number of blades in the circular array;

forming the leading planar surface 17 on the shroud 15 so that there is several thousandths of an inch interference when assembling adjacent blades;

machining each leading planar surface 17 individually to remove just enough material to allow assembly of the blade adjacent the trailing side of the adjacent blade, so that the blade can be assembled with the centerline of the blade in a radial plane; and machining the outer peripheral surface of the shroud portion 15 of the circular array of blades to form a cylindrical surface which cooperates with a labyrinth seal to form a rotating seal.

The blades and method hereinbefore described advantageously form a complete shroud ring greatly reducing blade vibration due to the snubbing and damping of the abutting shroud portions and eliminating riveted tenons, which accumulate corrosive products and are subject to corrosion and stress cracking.

What is claimed is:

1. A method of forming a circular array of blades wherein each of said blades has a root portion which fits into a rotor, a blade portion extending radially outwardly from the root portion and a shroud portion made integral with the blade portion and disposed on the radially outer end of the blade portion, said method comprises the steps of:

providing a plurality of said blades;

forming the shroud portion having a leading planar surface and a trailing planar surface;

forming the leading planar surface so that it is generally parallel with an axial radial plane passing through the central portion of the root portion;

forming the trailing planar surface so that if it were extended, it would form an angle with the axial radial plane generally equal in degrees to 360 divided by the number of blades in the array; and then assembling and joining said blades to form a circular array of blades.

2. The steps as set forth in claim 1 and further comprising:

forming the leading planar surface on the shroud so that there is several thousandths of an inch of interference when assembling adjacent blades; and machining each leading planar surface individually to remove just enough material to allow assembly of the blade adjacent the trailing side of an adjacent blade so that the blade centerline is in the axial radial plane.

3. The method as set forth in claim 2 and further comprising the step of machining the outer peripheral surface of the shroud portion of the circular array of blades to form a cylindrical surface.

* * * * *